United States Patent
Giubilo et al.

(10) Patent No.: US 9,523,524 B2
(45) Date of Patent: Dec. 20, 2016

(54) REFRIGERATION APPARATUS AND METHOD

(71) Applicants: Gary Giubilo, East Hanover, NJ (US); Gary Giubilo, II, East Hanover, NJ (US)

(72) Inventors: Gary Giubilo, East Hanover, NJ (US); Gary Giubilo, II, East Hanover, NJ (US)

( * ) Notice: Subject to any disclaimer, the term of this patent is extended or adjusted under 35 U.S.C. 154(b) by 470 days.

(21) Appl. No.: 14/267,951

(22) Filed: May 2, 2014

(65) Prior Publication Data

US 2015/0316302 A1 Nov. 5, 2015

(51) Int. Cl.

| | |
|---|---|
| *F25B 49/02* | (2006.01) |
| *F25B 13/00* | (2006.01) |
| *F25B 41/00* | (2006.01) |
| *F25B 40/04* | (2006.01) |
| *F25B 40/06* | (2006.01) |
| *F25B 25/00* | (2006.01) |

(52) U.S. Cl.
CPC .............. *F25B 49/02* (2013.01); *F25B 13/00* (2013.01); *F25B 40/04* (2013.01); *F25B 40/06* (2013.01); *F25B 41/00* (2013.01); *F25B 25/005* (2013.01); *F25B 2339/047* (2013.01); *F25B 2400/24* (2013.01); *F25B 2600/13* (2013.01); *F25B 2700/197* (2013.01); *F25B 2700/21* (2013.01); *F25B 2700/21151* (2013.01); *F25B 2700/21152* (2013.01); *F25B 2700/21175* (2013.01); *Y02B 30/745* (2013.01)

(58) Field of Classification Search
CPC ........... F25B 49/02; F25B 13/00; F25B 41/00; F25B 49/022; F25B 43/006; F25B 49/027; F25B 43/043; F25B 33/00

USPC .............................................. 62/115, 160, 498
See application file for complete search history.

(56) References Cited

U.S. PATENT DOCUMENTS

| | | | |
|---|---|---|---|
| 1,884,312 A | * | 10/1932 | Sloan .................... F25B 43/043 62/475 |
| 2,307,380 A | | 1/1943 | Baker |
| 2,385,667 A | | 9/1945 | Webber |
| 2,791,891 A | | 5/1957 | Lance |
| 2,797,554 A | | 7/1957 | Donovan |
| 3,131,553 A | | 5/1964 | Ross |
| 3,824,804 A | | 7/1974 | Sandmark |
| 4,577,468 A | | 3/1986 | Nunn, Jr. et al. |

(Continued)

*Primary Examiner* — Mohammad M Ali
(74) *Attorney, Agent, or Firm* — Thomas L. Adams

(57) ABSTRACT

A refrigeration apparatus that employs a refrigerant compressor has an expansion device coupled between an evaporator and a condenser. A first heat exchanger has (a) a main passage coupled between the evaporator and the inlet of the compressor, and (b) a complementary passage. This first heat exchanger may be a serpentine pipe inside a tank. A second heat exchanger has (a) a principal passage coupled between the condenser and the outlet of the compressor, and (b) an auxiliary passage. This second heat exchanger may be an inner and outer pair of coaxial pipes. The complementary passage of the first heat exchanger is coupled between a fluid pump and the auxiliary passage of the second heat exchanger. The auxiliary passage of the second heat exchanger is coupled between the fluid pump and the complementary passage of the first heat exchanger. A controller can operate the fluid pump based on measured parameters such as outside ambient temperature or compressor outlet pressure.

20 Claims, 2 Drawing Sheets

(56) References Cited

U.S. PATENT DOCUMENTS

| | | | | |
|---|---|---|---|---|
| 4,796,437 A | * | 1/1989 | James | F24H 4/04 |
| | | | | 62/238.6 |
| 5,040,380 A | * | 8/1991 | Gregory | F25B 5/02 |
| | | | | 165/908 |
| 5,211,029 A | * | 5/1993 | Uselton | F24F 5/0017 |
| | | | | 62/324.5 |
| 6,070,420 A | * | 6/2000 | Biancardi | F04C 29/0007 |
| | | | | 62/114 |

* cited by examiner

REFRIGERATION APPARATUS AND METHOD

BACKGROUND OF THE INVENTION

1. Field of the Invention

The present invention relates to direct expansion refrigeration apparatus and methods, and in particular, to apparatus and methods employing a condenser, evaporator and heat exchanging equipment.

2. Description of Related Art

The conventional, direct expansion refrigeration system employs an evaporator, compressor, condenser and expansion valve. The compressor compresses and thereby heats a gaseous refrigerant, which is thereafter condensed to release its heat in a condenser cooled by a fan. The liquefied refrigerant then passes through an expansion valve and an evaporator, which evaporate the refrigerant before it is returned to the compressor.

The expansion valve may be a thermal expansion valve that controls the flow rate of refrigerant through the evaporator based on its outlet temperature and pressure. The valve will regulate the evaporator's flow rate to maintain a desirable superheat that allows the refrigerant to evaporate at an appropriate rate. Inadequate evaporation may result in liquid refrigerant entering and damaging the compressor. An excessive evaporation rate may present a high load that can overheat and damage the compressor. Also, excessive evaporation may cause flashing, resulting in pressure fluctuations and premature expulsion of liquid refrigerant from the evaporator.

On a hot day an outdoor condenser may be unable to efficiently discharge heat and may experience an excessively high temperature and pressure. This condition will reduce the system's overall efficiency and may overheat or even damage the compressor. On the other hand, on cooler days the temperature and pressure of the refrigerant may drop, causing moisture to condense and freeze on the outside of an evaporator.

Cooling the average air conditioned home takes more than 2,000 kilowatt-hours per year. This process will also emit into the atmosphere 3,500 pounds of carbon dioxide and 31 pounds of sulfur dioxide per home (commonly designated as the carbon footprint). Today's best air conditioners are 30%-50% more efficient than air conditioners from the 1970's. However there has not been an upgrade in efficiency in nearly a decade, up until the present invention.

Central air conditioners are rated according to Seasonal Energy Efficiency Ratio (SEER). SEER indicates the ratio of the cooling output for a season relative to the amount of energy needed to provide that cooling output. As of January 2006 the minimum SEER allowed on the domestic market is 13 SEER, and the maximum available in standard air conditioning is around 20 SEER.

The presently disclosed apparatus provides an internal hydrothermal cooling loop that will dramatically improve the current Seasonal Energy Efficiency Ratio (SEER), and greatly reduce the carbon footprint left by every air conditioned home.

See also U.S. Pat. Nos. 2,307,380; 2,385,667; 2,791,891; 2,797,554; 3,131,553; 3,824,804; and 4,577,468.

SUMMARY OF THE INVENTION

In accordance with the illustrative embodiments demonstrating features and advantages of the present invention, there is provided a refrigeration apparatus employing a refrigerant. The apparatus includes an evaporator, a condenser, and communicating between them, an expansion device. The apparatus also has a compressor with an inlet and an outlet for compressing said refrigerant. Also included is a fluid pump for pumping a fluid. The apparatus also has a first and a second heat exchanger. The first heat exchanger has (a) a main passage communicating between the evaporator and the inlet of the compressor, and (b) a complementary passage. The second heat exchanger has (a) a principal passage communicating between the condenser and the outlet of the compressor, and (b) an auxiliary passage. The complementary passage of the first heat exchanger communicates between the fluid pump and the auxiliary passage of the second heat exchanger. The auxiliary passage of the second heat exchanger communicates between the fluid pump and the complementary passage of the first heat exchanger.

In accordance with another aspect of the invention, refrigeration apparatus employing a refrigerant includes an evaporator, and a condenser. Also included is an expansion device that communicates between the evaporator and the condenser. The apparatus also includes a compressor having an inlet and an outlet for compressing the refrigerant. Also included is a fluid pump and a first and a second heat exchanger. The fluid pump can pump a fluid that comprises distilled water with an antifreeze additive. The first heat exchanger has (a) a complementary passage, and (b) a main passage communicating between the evaporator and the inlet of the compressor. The main passage includes a tank. The second heat exchanger has (a) an auxiliary passage, and (b) a principal passage communicating between the condenser and the outlet of the compressor. The complementary passage of the first heat exchanger communicates between the fluid pump and the auxiliary passage of the second heat exchanger. The complementary passage includes a serpentine pipe located within the tank. The auxiliary passage of the second heat exchanger communicates between the fluid pump and the complementary passage of the first heat exchanger. The complementary passage is located downstream of the auxiliary passage. The auxiliary passage includes an inner pipe. The principal passage of the second heat exchanger includes an outer pipe mounted coaxially around the inner pipe. The fluid pump causes a fluid flow in the outer pipe that is counter to flow within the inner pipe. A controller can operate the fluid pump, and includes a first sensor and a second sensor. The first sensor and the second sensor are operable to control the fluid pump. The first sensor measures outside ambient temperature. The controller is arranged to operate the fluid pump when the outside ambient temperature exceeds a predetermined temperature threshold. The first sensor measures refrigerant pressure at the outlet of the compressor. The controller is arranged to operate the fluid pump when the refrigerant pressure at the outlet of the compressor exceeds a predetermined pressure threshold.

In accordance with yet another aspect of the invention, a refrigeration method is provided. The method employs an evaporator, a condenser, and an expansion valve communicating between the evaporator and the condenser. The method includes the step of compressing a refrigerant drawn from the evaporator. Another step is circulating a fluid to exchange heat between pre-compressed and post-compressed refrigerant. The method also includes the step of sending post-compressed refrigerant to the condenser. Another step is returning refrigerant from the condenser through the expansion valve to the evaporator.

By employing the foregoing apparatus and methods, an improved refrigeration system is achieved. In the disclosed embodiment an expansion valve is connected between the outlet of a condenser and the inlet of an evaporator. The outlet of the evaporator passes through a first heat exchanger and is compressed in a compressor before passing through a second heat exchanger and returning to the condenser.

The first heat exchanger may be a tank filled with a fluid such as water with an antifreeze additive. A serpentine pipe passing through this tank carries the refrigerant from the evaporator to the compressor. In this embodiment the compressor then feeds compressed refrigerant to the condenser through an inner coaxial pipe surrounded by a larger coaxial pipe. These two coaxial pipes act as the second heat exchanger.

A disclosed pump circulates the water between the tank of the first heat exchanger and the volume between the inner and outer coaxial pipes of the second heat exchanger. Consequently, the water in the tank of the first heat exchanger is cooled by the relatively cold refrigerant from the evaporator that is passing through the serpentine pipe in the tank. The water cooled in the tank circulates through the outer coaxial pipe of the second heat exchanger to cool the relatively hot, compressed refrigerant passing through the inner coaxial pipe on the way to the condenser. In reaction, the water in the second heat exchanger is warmed by the relatively hot refrigerant.

In effect, the relatively hot refrigerant discharged from the compressor is cooled by the relatively cool refrigerant traveling toward the compressor's inlet. Therefore, temperatures on either side of the compressor are moderated. As a result, the absolute temperatures and pressures at the compressor, as well as the temperature and pressure differentials, are moderated to reduce the loading and the likelihood of overheating and damage to the compressor.

Also, reducing pressure in this manner reduces the overall evaporator load. In addition, slightly warming refrigerant from the evaporator in the tank of the first heat exchanger reduces the likelihood of liquid refrigerant flooding and possibly damaging the compressor.

The water pump can be regulated by a variety of sensors. For example, the pump can be started if the outside ambient air is relatively hot, if the outlet pressure of the compressor is too high, or if relatively hot air is being discharged from the condenser. Any of these conditions indicate a high system load requiring the foregoing heat exchange. Also if the water in the tank is too low or too warm, the heat exchangers will not operate properly and the water pump will not be enabled. Also, if the compressor's inlet pressure is too low, the pump may be halted to prevent freezing at the evaporator.

BRIEF DESCRIPTION OF THE DRAWINGS

The above brief description as well as other objects, features and advantages of the present invention will be more fully appreciated by reference to the following detailed description of illustrative embodiments in accordance with the present invention when taken in conjunction with the accompanying drawings, wherein.

DETAILED DESCRIPTION

Figure 1:
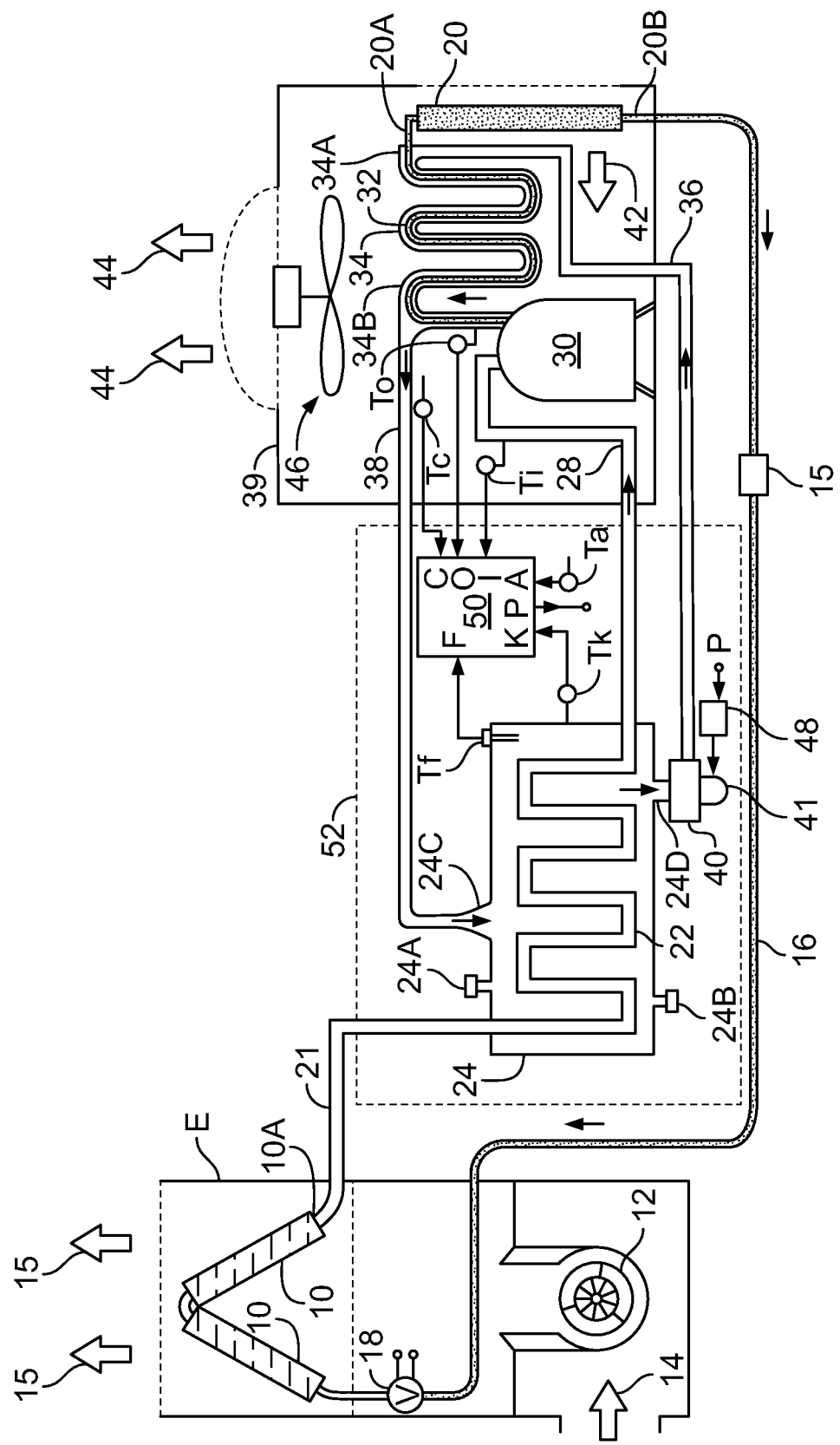
FIG. 1 is schematic diagram of a refrigeration system exemplifying an apparatus and method in accordance with principles of the present invention.

Referring to FIG. 1, housing E contains a pair of evaporator coil assemblies 10 mounted above blower 12 which sucks in air along flow path 14. This incoming air, typically drawn from an interior living space, is later discharged along path 15 after having passed through the evaporator coils 10.

Expansion valve 18 is connected between evaporator 10 and condenser 20. Specifically, liquid refrigerant drawn from the outlet 20B of condenser 20 and through conduit 16, will pass through filter dryer 15 and arrive at the inlet of thermal expansion valve (TXV) 18. Valve 18 has a pair of conventional sensor inputs for monitoring the temperature and pressure at the outlet 10A of the evaporator 10.

Conduit 21 feeds the output 10A of evaporator 10 to a serpentine pipe 22 located inside tank 24. Tank 24 may be filled with distilled water mixed with an antifreeze additive such as ethylene glycol or propylene glycol, although other antifreeze agents may be used instead. In some cases, the water may be replaced with other liquids.

As explained further hereinafter, pipe 22 and tank 24 act as a first heat exchanger. Tank 24 is also referred to as a main passage, while pipe 22 is referred to as a complementary passage. Tank 24 may be made of a polyurethane thermoplastic, although in other embodiments the tank may be made of different plastics, sheet metal, etc. Tank 24 may be filled through inlet 24A and drained through outlet 24B.

Serpentine pipe 22 feeds the suction line 28 leading to the intake of compressor 30, whose outlet discharges through coiled line 32 to the inlet of condenser coil 20. Line 32 is a pipe mounted coaxially inside larger pipe 34. As explained further hereinafter, pipes 32 and 34 act as a second heat exchanger. Pipes 32 and 34 are also referred to herein as a principal passage and auxiliary passage, respectively. Pipes 32 and 34 may be copper although different pipe materials may be used in other embodiments. Outer pipe 34 has an inlet 34A supplied by conduit 36 and an outlet 34B feeding conduit 38.

Compressor 30, condenser 20, and coaxial pipes 32 and 34 are mounted inside cabinet 39. Cabinet 39 contains a motor driven fan 46 for drawing air through condenser 20, along paths 42 and 44, making the condenser air cooled.

Previously mentioned conduit 38 is shown discharging into upper inlet 24C of tank 24. Tank 24 has a lower outlet 24D feeding the intake of fluid pump 40, whose outlet discharges through line 36 to inlet 34A. In this embodiment pump 40 is driven by motor 41, which is powered by 24 VDC, a potential normally available for the control circuits of conventional air-conditioning systems.

A low level of fluid in tank 24 can be detected by sensor Tf, which transmits a binary signal (adequately filled, or not) to input F of controller 50. Also, the temperature of fluid in tank 24 can be measured by sensor Tk, which transmits an analog signal to input K of controller 50. While sensor Tk is shown mounted in the wall of tank 24, in some embodiments the sensor may be mounted at the outlet of pump 40.

The pressures at the inlet and outlet of compressor 30 are measured by sensors Ti and To, respectively, which sensors transmit analog signals to inputs and I and O, respectively, of controller 50. The temperature of the airflow leaving condenser 20 and traveling along path 42/44 is measured by sensor Tc, which transmits an analog signal to input C of controller 50. The temperature of the outside ambient air is measured by sensor Ta, which transmits an analog signal to input A of controller 50. Among the sensors Ta, Tk, To, Ti, Tc, and Tf, one of them may be referred to as a first sensor, and another one as a second sensor.

Controller 50 has an output P that connects to the control terminal of contactor 48, which switches 24 VDC to pump motor 41 in order to start and stop pump 40. Tank 24, pump 40, controller 50, contactor 48 and sensors and Tk and Ta may be contained in a single housing 52 with appropriate fittings (not shown) for connecting to lines 21, 28, 36, and 38. Housing 52 may be located near cabinet 39, evaporator housing E, or some other convenient location. Housing 52 may also have appropriate connectors (not shown) to connect to sensors Tc, To, and Ti. In some embodiments where housing 52 is located near compressor 30, sensors To and Ti may be located inside housing 52 and will connect through appropriate pressure lines to the intake and outlet of compressor 30.

While heat exchanger 32/34 is shown mounted in enclosure 39, in some embodiments the heat exchanger 32/34 and lines 36 and 38 will be mounted inside housing 52 with appropriate fittings (not shown) for connecting to the inlet 20A of condenser 20 and the inlet and outlet of compressor 30. In other embodiments cabinet 39 and housing 52 will be merged into a single enclosure. In still other embodiments, housings 52 and E will be merged into a single housing.

Figure 2:
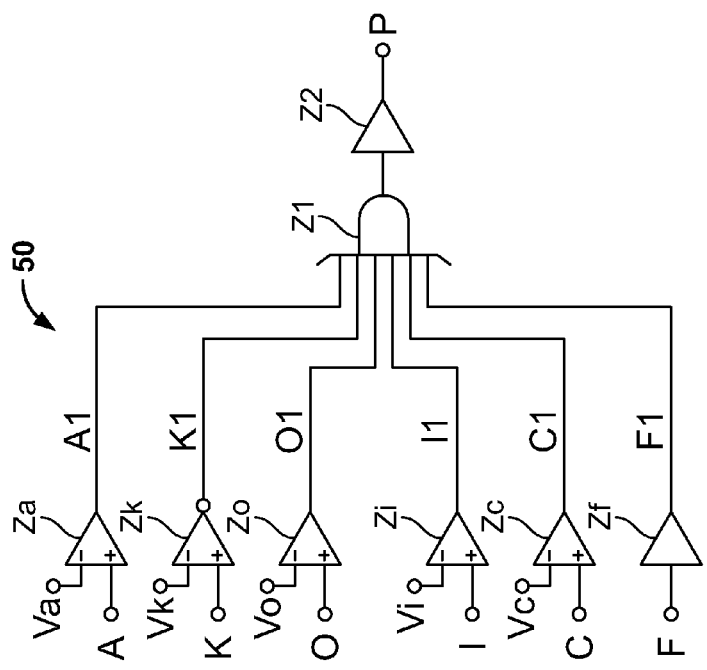
FIG. 2 is a schematic diagram of the controller of FIG. 1.

Referring to FIG. 2, previously mentioned controller 50 is shown in further detail. Previously mentioned controller inputs A, K, O, I, and C are shown connected to the non-inverting inputs of comparators Za, Zk, Zo, Zi, and Zc, respectively, whose inverting inputs are shown connected to respective threshold potentials Va, Vk, Vo, Vi, and Vc. Comparators Za, Zk, Zo, Zi, and Zc have outputs A1, K1, O1, I1, and C1, respectively. Output K1 is inverted.

The binary signal on terminal F (adequate/inadequate liquid level) is connected through buffer Zf to output line F1.

If the outside, ambient temperature signal on terminal A indicates a relatively high temperature (e.g. exceeding a predetermined temperature threshold of, for example, 70° F.), there will be a need for the foregoing heat exchangers. In that case the signal on terminal A will be greater than the threshold potential at terminal Va and so, in response, comparator Za will produce a GO signal, that is, a high signal on line A1.

In a similar manner, if the tank temperature (also referred to as the temperature at main passage 24 of first heat exchanger 22/24) is too low, the heat exchangers will be ineffective. In that case the temperature signal on terminal K will indicate a relatively low temperature (e.g. predetermined temperature threshold of less than 65° F.), which will be less than the threshold potential at terminal Vk and so, in response, the inverted output of comparator Za will produce a high GO signal on line K1.

Similarly, if the signal on terminal O indicates a relatively high refrigerant pressure on the compressor outlet (e.g. the post-compressed pressure exceeds a predetermined pressure threshold of 250 psi) there will be a need for the foregoing heat exchangers. In that case the signal on terminal O will be greater than the threshold potential at terminal Vo and so, in response, comparator Zo will produce a high GO signal on line O1.

Also, if the signal on terminal I indicates a relatively high refrigerant pressure on the compressor inlet (e.g. the pre-compressed pressure exceeds a predetermined pressure threshold of 100 psi) that signal will be greater than the threshold potential at terminal Vi and so, in response, comparator Zi will produce a high GO signal on line I1. A low pressure signal on input I indicates a low evaporator pressure and a tendency for icing at evaporator 10.

If the signal on terminal C indicates a relatively high temperature for the air leaving condenser 20 (e.g. predetermined temperature threshold greater than 70° F.) there will be a need for the foregoing heat exchangers. In that case the signal on terminal C will be greater than the threshold potential at terminal Vc and so, in response, comparator Zc will produce a high GO signal on line C1.

It will be appreciated that the magnitude of the potentials Va, Vk, Vo, Vi, and Vc can be varied to change the respective thresholds. These thresholds can be set to accommodate various operating parameters (expected ambient temperatures, BTU rating of the system, type of refrigerant, size of the evaporator and condenser, etc.)

The binary signal on terminal F (adequate/inadequate liquid level) will be transferred through buffer Zf to produce a high GO signal when the liquid level in tank 24 (FIG. 1) is adequate (i.e., predetermined fluid level has been achieved).

Outputs A1, K1, O1, I1, C1, and F1 are connected to the six separate inputs of AND gate Z1. If all inputs of AND gate Z1 indicate a GO condition (high signals), the gate will produce a high signal that is applied to driver Z2 to produce an enabling output on previously mentioned terminal P.

It will be appreciated that some embodiments will eliminate one or more of the enabling outputs A, K, O, I, C, and F. Such embodiments may also incorporate different enabling outputs in addition to, or in place of, the enabling outputs illustrated in FIG. 2. In some simplified embodiments, all of these outputs will be eliminated and pump 40 (FIG. 1) will simply be operating continuously, or whenever compressor 30 is operating.

Figure 3:
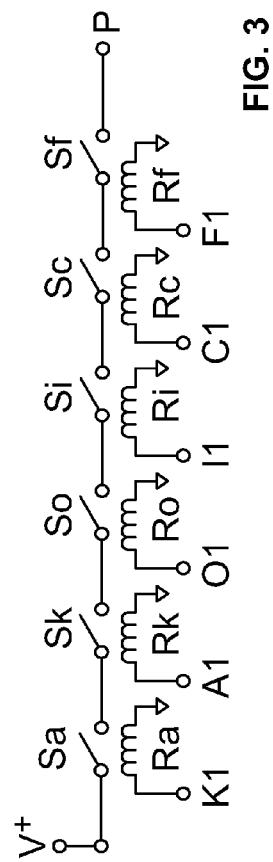
FIG. 3 is a schematic diagram of relay logic that is an alternate to the logic gate illustrated in FIG. 2.

Referring to FIG. 3 the previously mentioned AND gate (gate Z1 of FIG. 2) is replaced with the illustrated relay logic circuit. Specifically, relay coils Ra, Rk, Ro, Ri, Rc, and Rf are driven by previously mentioned output lines A1, K1, O1, I1, C1, and F1, respectively. Relay coils Ra, Rk, Ro, Ri, Rc, and Rf operate normally open relay contacts Sa, Sk, So, Si, Sc, and Sf, respectively, which are connected in series between positive potential V+ and previously mentioned terminal P. Accordingly, when all of the output lines A1, K1, O1, I1, C1, and F1 have a high GO signal, all of the relay contacts Sa, Sk, So, Si, Sc, and Sf will be closed to apply potential V+ to terminal P.

To facilitate an understanding of the principles associated with the foregoing apparatus, its operation will be briefly described. Assuming initially that pump 40 is stopped, the refrigeration system of FIG. 1 will operate in the conventional manner. Specifically, gaseous refrigerant in line 28 will be compressed by compressor 30, and flow through line 32 before being delivered to condenser 20. The relatively hot refrigerant arriving at condenser 20 will be close to its saturation temperature and will condense as heat is removed by the airflow along paths 42 and 44 caused by fan 46.

The now liquefied refrigerant passes through filter 15 and expansion valve 18. Expansion valve 18 regulates the flow through evaporator 10 so the refrigerant fully evaporates, and its superheat at the outlet of evaporator 10 is kept at a desirable value (e.g. 7° F.). The gaseous refrigerant returning through conduits 21, 22 and 28 is eventually fed to the inlet of compressor 30 to complete the cycle.

Pump 40 will not operate if any of the signals at input terminals A, K, O, I, C, or F indicate pump operation is unwarranted. Specifically, pump 40 will not start if:

(1) The signal on input A indicates a relatively cool ambient temperature outside. When the outside ambient temperature is relatively low, great demands are not made on the compressor 30 or other system components, and so the heat exchanging features of the present system are not needed.

(2) The signal on input K indicates a relatively warm tank temperature. If the temperature of fluid in tank 24 is too warm, the fluid will be unable to cool the refrigerant flowing in pipe 22, which defeats a significant purpose of the present arrangement.

(3) The signal on input O indicates a relatively low pressure on the compressor outlet. Low compressor outlet pressure generally indicates low load and efficient operation, and therefore no need to run the heat exchangers of the present arrangement.

(4) The signal on input I indicates a relatively low pressure on the compressor inlet. The present system tends to further decrease pressure at the compressor inlet, and so operation of pump 40 under these circumstances might lower the pressure further and cause freezing on the coils of evaporator 10.

(5) The signal on input C indicates a relatively low temperature for the air discharged from condenser 20. This low air temperature indicates the refrigeration system is not highly loaded and does not need the advantages provided by the heat exchangers of the present system.

(6) The binary signal on terminal F indicates an inadequate liquid level and therefore pump 40 should not be operated.

If however, none of the above six preclusions applies, then inputs A, K, O, I, C, and F will cause devices Za, Zk, Zo, Zi, Zc, and Zf to all apply high signals to the six inputs of AND gate Z1 (FIG. 2). In response, driver Z2 produces an enabling signal on terminal P that operates contactor 48 (FIG. 1) to start pump motor 41. In the alternative embodiment of FIG. 3, all of the relay coils Ra, Rk, Ro, Ri, Rc, and Rf will be energized to close all of the relay contacts Sa, Sk, So, Si, Sc, and Sf. Consequently an enabling potential will be applied to terminal P to operate contactor 48 (FIG. 1) and start pump motor 41.

In either case, the fluid drawn from tank 24 by pump 40 will circulate through conduit 36, pipe 34, and conduit 38, before returning to tank 24.

Refrigerant leaving evaporator 10 has just evaporated and is relatively cold. This cold refrigerant passes through conduit 21 and into serpentine pipe 22, which is immersed in the fluid in tank 24. The foregoing pipe 22 and tank 24 will then operate as a heat exchanger, with pipe 22 chilling the fluid in tank 24, and, in reaction, warming the refrigerant slightly.

This cool fluid in tank 24 is pumped by pump 40 through conduit 36 and outer coaxial pipe 34, which surrounds inner coaxial pipe 32. Coaxial pipes 32 and 34 act as a heat exchanger, with outer pipe 34 cooling the hot refrigerant traveling in inner pipe 32, and, in reaction, warming the fluid that is returned to tank 24 through conduit 38.

These two heat exchanges (heat exchanger 32/34 and heat exchanger 22/24) tend to lower the temperature of refrigerant discharged from compressor 30 and raise the temperature of refrigerant sucked into the compressor. Consequently, the temperatures at compressor 34 are moderated, which reduces the likelihood of overheating and damage to the compressor. Also, a lower temperature differential across the compressor 30 tends to reduce the pressure differential across the compressor, as well as reducing the absolute pressure at the compressor's outlet. These pressure reductions reduce the loading and the possibility of damage to compressor 30.

Also, reducing the temperature of refrigerant arriving at condenser 10 will reduce the temperature at evaporator 10 to decrease the likelihood of flashing that may eject liquid refrigerant from the evaporator and into compressor 30, which may damage the compressor. Also, the warming of refrigerant passing through pipes 22 in tank 24 will also reduce the likelihood of unevaporated, liquid refrigerant entering, flooding, and possibly damaging compressor 30.

The refrigerant temperature in inner coaxial pipe 34 has a much greater temperature differential relative to ambient temperature, when compared to the temperature in suction line 21 of evaporator 10. To maintain moderate temperatures and avoid boiling of fluid in outer coaxial pipe 34, its volume is kept small to maintain a relatively short transit time and reduce the amount of heat captured from inner coaxial pipe 32.

In some embodiments the volume of fluid in tank 24 will be 10 to 20 times greater than the volume of fluid in outer coaxial pipe 34, although other ratios will be employed in other instances depending upon the rating of the refrigeration system, the total volume of fluid, the size and surface area of the heat exchanging elements, etc.

When the system has reached equilibrium, the BTUs removed from inner coaxial pipe 32 by fluid flowing in outer coaxial pipe 34 equals the BTUs added to tank 24 by the heated fluid arriving through inlet 24C, which in turn also equals the BTUs removed by serpentine pipe 22. With equal BTU rates, the temperature gradient and temperature excursion is much greater in the relatively small volume of fluid in outer coaxial pipe 34, when compared to the relatively large volume of fluid in tank 24. In one embodiment, the volume of fluid and the flow rate of pump 40 were arranged to keep the average temperature of fluid in tank 24 about 10° F. to 30° F. above the outside ambient temperature, although different temperature differentials may be employed in other embodiments.

The foregoing operations favorably adjust the temperatures and pressures at the evaporator, condenser, and compressor to increase efficiency and prevent damage due to overheating or overloading.

The foregoing control system is bistable and can, in some cases, be implemented by a programmable logic controller (PLC), microcontroller, or microprocessor. In some embodiments stability may be enhanced by providing a certain amount of hysteresis.

Figure 4:
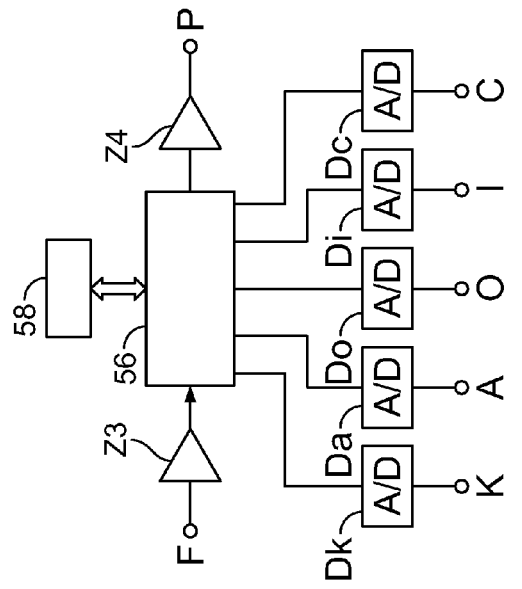
FIG. 4 is a schematic diagram of a controller that is an alternate to that of FIGS. 2 and 3.

Referring to FIG. 4, previously mentioned analog signals at terminals K, A, O, I, and C are connected to the inputs of analog to digital converters Dk, Da, Do, Di, and Dc, respectively, whose outputs are connected to microcontroller 56. In some embodiments, the analog to digital conversion circuitry may be incorporated in the microcontroller itself. The previously mentioned tank level signal on terminal F is coupled through buffer Z3 to a separate binary input of microcontroller 56.

The output of microcontroller 56 is coupled through buffer Z4 to previously mentioned output terminal P. As before, the output on terminal P may be an on/off signal that causes contactor 48 (FIG. 1) to start/stop pump motor 41.

Microcontroller 56 is shown communicating with digital memory 58, which may be a programmable read-only memory (PROM), or other memory type. In some embodiments this memory may be incorporated as an integral feature of the microcontroller. Memory 58 may have a program that simply duplicates the functions performed by the combinational logic circuits of FIG. 2 or 3.

In other embodiments, the output on terminal P may be an analog signal designed to adjust a flow rate from pump 40

(FIG. 1). For example, the speed of motor 41 (FIG. 1) may be adjusted in proportion to the magnitude of the output signal on terminal P.

In some embodiments the compressor's outlet pressure as reflected on terminal O may be an analog feedback signal that is used to continuously adjust pump speed by adjusting the analog output on terminal P. Microcontroller 56 will then adjust pump speed in order to keep the compressor's output pressure at a target value or range. The control system may be proportional, PI, or PID.

In some cases two or more of the inputs to microcontroller 56 may be considered state variables defining the state of the system as a vector in a multidimensional space. The characteristics of the system can be described through an appropriate transfer function. Feedback control can be implemented by multiplying the state variables by a matrix to develop an appropriate control signal.

It is appreciated that various modifications may be implemented with respect to the above described embodiments. For example, the foregoing arrangement may be part of a single residential or multi-unit commercial air conditioning system, or part of a system for refrigerating perishable items such as food. The foregoing controller can be modified to respond to alternate sets of inputs, which may include some of the same inputs and possibly different inputs. In some cases the controller may be part of a larger system that controls the compressor, expansion valve, etc. In still other cases, the controller can be part of a system that regulates multiple air conditioning systems, monitors nearby unrelated equipment, provides security for home or office, etc. Instead of regulating the foregoing water pump, some embodiments may regulate a valve connected in series or parallel with the pump. In still other embodiments, the heat exchangers may be regulated with a valve that allows the pumped water to bypass one or both of the heat exchangers. While the foregoing water pump is shown downstream of the tank, in some embodiments the pump may be located upstream.

Obviously, many modifications and variations of the present invention are possible in light of the above teachings. It is therefore to be understood that within the scope of the appended claims, the invention may be practiced otherwise than as specifically described.

The invention claimed is:

1. A refrigeration apparatus employing a refrigerant and comprising: an evaporator; a condenser; an expansion device communicating between said evaporator and said condenser; a compressor having an inlet and an outlet for compressing said refrigerant; a fluid pump for pumping a fluid; a first heat exchanger having (a) a main passage communicating between said evaporator and the inlet of said compressor, and (b) a complementary passage; a second heat exchanger having (a) a principal passage communicating between said condenser and the outlet of said compressor, and (b) an auxiliary passage; said complementary passage of said first heat exchanger communicating between said fluid pump and the auxiliary passage of said second heat exchanger; and said auxiliary passage of said second heat exchanger communicating between said fluid pump and said complementary passage of said first heat exchanger.

2. The refrigeration apparatus according to claim 1 wherein said fluid comprises water with an antifreeze additive.

3. The refrigeration apparatus according to claim 1 wherein said complementary passage is located downstream of said auxiliary passage.

4. The refrigeration apparatus according to claim 1 wherein said main passage of said first heat exchanger comprises a tank, said complementary passage of said of first heat exchanger comprising: a serpentine pipe located within said tank.

5. The refrigeration apparatus according to claim 1 wherein said principal passage of said second heat exchanger comprises an outer pipe, said auxiliary passage of said of second heat exchanger comprising: an inner pipe located coaxially within said outer pipe.

6. The refrigeration apparatus according to claim 1 comprising: a controller for controlling one or more of said fluid pump, and said first and said second heat exchanger.

7. The refrigeration apparatus according to claim 6 wherein said controller includes a first sensor for controlling said fluid pump.

8. The refrigeration apparatus according to claim 7 wherein said first sensor measures outside ambient temperature, said controller being arranged to operate said fluid pump when said outside ambient temperature exceeds a predetermined temperature threshold.

9. The refrigeration apparatus according to claim 7 wherein said first sensor measures refrigerant pressure at said outlet of said compressor, said controller being arranged to operate said fluid pump when said refrigerant pressure at said outlet of said compressor exceeds a predetermined pressure threshold.

10. The refrigeration apparatus according to claim 9 comprising a second sensor for measuring outside ambient temperature, said controller being arranged to operate said fluid pump when both of the following apply: (a) said outside ambient temperature exceeds a predetermined temperature threshold, and (b) said refrigerant pressure at said outlet of said compressor exceeds a predetermined pressure threshold.

11. The refrigeration apparatus according to claim 6 wherein said controller is arranged to run said fluid pump simultaneously with said compressor.

12. The refrigeration apparatus according to claim 7 wherein said first sensor measures refrigerant pressure at said inlet of said compressor, said controller being arranged to operate said fluid pump when said refrigerant pressure at said inlet of said compressor exceeds a predetermined pressure threshold.

13. The refrigeration apparatus according to claim 7 wherein said first sensor measures temperature at said main passage of said first heat exchanger, said controller being arranged to operate said fluid pump when said temperature at said main passage is less than a predetermined temperature threshold.

14. The refrigeration apparatus according to claim 7 wherein said condenser is air cooled, said first sensor being operable to measure air temperature leaving said condenser, said controller being arranged to operate said fluid pump when air temperature leaving said condenser exceeds a predetermined temperature threshold.

15. The refrigeration apparatus according to claim 4 comprising: a controller having a first sensor for controlling said fluid pump, said first sensor being operable to sense fluid in said tank achieving a predetermined fluid level, said controller being arranged to operate said fluid pump when said first sensor senses fluid in said tank achieving the predetermined fluid level.

16. A refrigeration apparatus employing a refrigerant and comprising: an evaporator; a condenser; an expansion device communicating between said evaporator and said condenser; a compressor having an inlet and an outlet for compressing said refrigerant; a fluid pump for pumping a fluid, said fluid comprising water with an antifreeze additive; a first heat exchanger having
(a) a complementary passage, and (b) a main passage communicating between said evaporator and the inlet of said compressor, said main passage including a tank; a second heat exchanger having (a) an auxiliary passage,
and (b) a principal passage communicating between said condenser and the outlet of said compressor; said complementary passage of said first heat exchanger communicating between said fluid pump and the auxiliary passage of said second heat exchanger, said complementary passage including a serpentine pipe located within said tank; said auxiliary passage of said second heat exchanger communicating between said fluid pump and said complementary passage of said first heat exchanger, said complementary passage being located downstream of said auxiliary passage, said auxiliary passage comprising an inner pipe, said principal passage of said second heat exchanger including an outer pipe mounted coaxially around said inner pipe, said fluid pump causing a fluid flow in said outer pipe that is counter to flow within said inner pipe; a controller for operating said fluid pump, said controller including a first sensor and a second sensor, said first sensor and said second sensor being operable to control said fluid pump, said first sensor measuring outside ambient temperature, said controller being arranged to operate said fluid pump when said outside ambient temperature exceeds a predetermined temperature threshold, said first sensor measuring refrigerant pressure at said outlet of said compressor, said controller being arranged to operate said fluid pump when said refrigerant pressure at said outlet of said compressor exceeds a predetermined pressure threshold.

17. A refrigeration method employing an evaporator, a condenser, and an expansion valve communicating between said evaporator and said condenser, the method including the steps of: compressing a refrigerant drawn from said evaporator; circulating a fluid to exchange heat between pre-compressed and post-compressed refrigerant; sending post-compressed refrigerant to said condenser; and returning refrigerant from said condenser through said expansion valve to said evaporator.

18. The refrigeration method according to claim 17 comprising the steps of: measuring outside ambient temperature; and circulating the fluid when the outside ambient temperature exceeds a predetermined temperature threshold.

19. The refrigeration method according to claim 17 comprising the steps of: measuring the pressure of post-compressed refrigerant; and circulating the fluid when the pressure of post-compression refrigerant exceeds a predetermined pressure threshold.

20. The refrigeration method according to claim 17 wherein said condenser is air cooled, the method comprising the steps of: measuring pressure of pre-compressed refrigerant; measuring temperature of air leaving the condenser; and circulating fluid when both (a) the pre-compressed refrigerant pressure exceeds a predetermined pressure threshold, and (b) the temperature of air leaving the condenser exceeds a predetermined temperature.

* * * * *